A method of controlling filamentous bacteria responsible for foaming and bulking in wastewater systems with virulent bacteriophage. The method includes, optionally, identification of problematic filamentous bacteria and matching virulent bacteriophage, use of bacteriophage from phage libraries and concentration of filamentous bacteria and bacteriophage from the wastewater to be treated.

(12) United States Patent
Liu et al.

(10) Patent No.: US 8,241,499 B2
(45) Date of Patent: *Aug. 14, 2012

(54) CONTROL OF FILAMENTOUS BACTERIA INDUCED FOAMING IN WASTEWATER SYSTEMS

(75) Inventors: Mei Liu, College Station, TX (US); Elizabeth Summer, College Station, TX (US); Sarah Duggleby, College Station, TX (US)

(73) Assignee: Phage Biocontrol Research, LLC, College Station, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/039,150

(22) Filed: Mar. 2, 2011

(65) Prior Publication Data

US 2011/0215050 A1 Sep. 8, 2011

Related U.S. Application Data

(60) Provisional application No. 61/311,754, filed on Mar. 8, 2010.

(51) Int. Cl.
*C02F 3/00* (2006.01)
*C02F 3/34* (2006.01)
*C02F 3/12* (2006.01)
*C12M 1/34* (2006.01)

(52) U.S. Cl. ................ 210/608; 210/606; 435/287.1

(58) Field of Classification Search ............... None
See application file for complete search history.

(56) References Cited

U.S. PATENT DOCUMENTS

| | | | |
|---|---|---|---|
| 4,778,653 | A | 10/1988 | Kamimura et al. |
| 5,614,098 | A | 3/1997 | Shao et al. |
| 6,699,701 | B1 | 3/2004 | Sulaknalisze et al. |
| 6,926,833 | B2 | 8/2005 | van Reis |
| 2008/0213752 | A1 | 9/2008 | Stave et al. |
| 2010/0243563 | A1 | 9/2010 | Summer et al. |
| 2011/0215050 | A1* | 9/2011 | Mei et al. ............... 210/608 |

OTHER PUBLICATIONS

Morisada et al. (Journal of Microbiological Methods. 2002; 51: 141-148).*
Jorgensen et al. (Water Research. 1992; 26 (11): 1495-1501, abstract provided).*
S. Withey, E. Cartmell*, L.M. Avery, T. Stephenson; Bacteriophages—potential for application in wastewater treatment processes; School of Water Sciences, Cranfield University, 2005. Cranfield, Bedfordshire, MK43 0AL, UK; accepted Sep. 2, 2004.
Thomas, Soddell & Kurtboke; Fighting foam with phage?;Water Treatment and Technology, vol. 46,No. 1-2, pp. 511-553, 2002.
Ramothokang,Drysdale and Bux; Isolation and ciultivation of filamentous bacteria implicated in activated sludge bulking; Water SA, vol. 29, No. 4,Oct. 2003, pp. 405-410.
Sakaguchi, et al (Control of Microbiofouling Using Bacteriophage 2. Detection of Phages and Fundamental Study of Their Lytic Effect on Fouling Bacteria (Abstract Only), De, 1989.
Lee, et al (Molecular analysis of a mixed-species biofilm on carbon steel. Abstracts of the General Meeting of the Americam Society for Microbiology. 2003; vol. 103:Q-156).
Zacheus et al, Soft Deposits, The Key Site for Microbial Groth in Drinking Water Distribution Networks; Wat. Res. Vi ol. 35, No. 7, pp. 1757-1765,2001.

* cited by examiner

*Primary Examiner* — Shanon A Foley
(74) *Attorney, Agent, or Firm* — Douglas Baldwin

(57) ABSTRACT

A method of controlling filamentous bacteria responsible for foaming and bulking in wastewater systems with virulent bacteriophage. The method includes, optionally, identification of problematic filamentous bacteria and matching virulent bacteriophage, use of bacteriophage from phage libraries and concentration of filamentous bacteria and bacteriophage from the wastewater to be treated.

17 Claims, No Drawings

CONTROL OF FILAMENTOUS BACTERIA INDUCED FOAMING IN WASTEWATER SYSTEMS

RELATIONSHIP TO OTHER APPLICATIONS

This application claims benefit of Application Ser. No. 61/311,754 filed Mar. 8, 2010.

FIELD OF THE INVENTION

This invention relates to a method of reducing foaming, bulking and process interruptions in wastewater systems by altering the populations of foam-associated filamentous bacteria in the wastewater system. More specifically, the control of the offending bacteria is achieved by treating the system with an effective amount of phages virulent for strains of the offending bacteria.

BACKGROUND OF INVENTION

Foaming and bulking are widespread problems that negatively impact the activity of wastewater treatment facilities worldwide. Wastewater treatment plants are utilized by municipalities, in industry, and by agricultural operations for the treatment and disposal of liquid and wet wastes. Commonly treated wet and liquid wastes include human wastes, wet wastes from industry including food, manufacturing, energy, chemical, mining and heavy industries, as well as the liquid animal and chemical wastes generated by agricultural and defense-related activities. An activated sludge process, nominally consisting of aeration tank(s) or basin(s) and settling tanks, is frequently used in wastewater treatment regimes. The activated sludge process is microbiological, relying on complex consortia of micro- and macro-organisms to convert the undesirable waste components into forms acceptable for disposal.

Ubiquitous challenges that negatively impact the activated sludge process are the related phenomena of bulking and foaming. Bulking is characterized by the poor settleability of activated sludge. Foaming is characterized by large volumes of foams and solids that accumulate on the surface of aeration basins and settling tanks. Foaming not only forms a physical nuisance by interfering with normal mechanical systems but also hinder biological activities through decreasing oxygen transfer efficiencies and by trapping waste gasses. Foaming and bulking may be chronic or periodic problems for wastewater plant systems. In some instances, large volumes of foam may be dispersed throughout the plant: in aerators, sedimentation basins and, in extreme cases, outside the premises all the way into the car park or surrounding areas Apart from the nuisance, bulking sludge and foam decrease the efficiency of the plant and may also make it difficult to achieve the required performance criteria, which is costly to the plant.

Bulking and foaming at wastewater treatment facilities is frequently associated with the presence of filamentous bacteria. Filamentous bacteria, as the term implies, are bacteria that grow in branched or unbranched filaments that range from several to hundreds of microns in length. Filamentous bacteria are an important component of healthy activated sludge as low levels of filaments are required for proper floc formation and settling of solids. Flocs contain both filamentous and non-filamentous bacteria. Problems can arise in the system when there is an over abundance of filamentous organisms. Filamentous bacteria promote bulking when filaments extend from one floc particle to another and form interfloc bridging or when there are filament-associated voids in the floc that increase buoyancy. Very large floc mats may also form into a floating scum that interferes with settling of sludge solids. Filamentous bacteria promote foaming due in part to the stabilizing effect of hydrophobic cells and surfactants have on the partitioning and stabilizing of gas bubbles.

A variety of methods are used to counter foaming and bulking within wastewater treatment facilities. However, none of the currently available methods are completely effective and the down time and loss of plant efficiency while dealing with foaming problems results in environmental risks and increased costs. These control methods including chemical antifoaming agents, physical control of foams, forceful chlorinated water sprays, and return sludge chlorination. Additionally, biological control treatments are commercially available. These are typically based on application of bacteria capable of suppressing filamentous bacteria. One of the confounding issues in developing anti-foaming and bulking treatments is the concern about specific control of the filamentous bacteria without disrupting the general microbial population involved in water remediation. Therefore, strong, non-discriminate biocides are not an appropriate option. Plant design, including aeration basin flow and aeration characteristics, is well known to affect the degree to which foaming and bulking occur. Ideally, all plants should be constructed in such a way as to limit foaming and bulking. However, replacing existing facilities is not always feasible and there will be a need to control foaming and bulking as long as plants that experience periodic foaming and bulking issues remain in operation. There is an ongoing need to develop new methods to control filamentous bacteria associated foaming within the wastewater treatment industry.

A treatment designed to reduce filamentous bacterial levels to non-problem levels without disrupting other microbiological events in the treatment plant constitutes the ideal control method. Bacteriophages, or phages, have the potential to be this ideal control agent. Phages are the ubiquitous and natural viral predators of bacteria. During the lytic infection process, a phage recognizes its specific host bacteria and injects the genomic DNA into the host cell. New phage particles are assembled, ~100 per host cell, over the course of minutes to several hours. Phage encoded proteins produce catastrophic disintegration of the bacterial cell in a process termed lysis. Lysis kills the host cell and disperses progeny phage into the environment where they can adsorb to new bacterial hosts and begin the process again. The phage/host relationship is very specific: only certain species or strains of bacteria are targeted by any one phage. Phages are remarkably abundant in the environment, more so than bacteria. This abundance is mirrored by extremely high diversity. Because of their ubiquity, their specificity for bacterial cells, and their lack of interaction with human, animal, or plant cells, phages have been assigned the status of generally regarded as safe (GRAS). The bacteriolytic, yet extremely specific, nature of phages can be utilized to control the population of foaming and bulking associated filamentous bacteria without disrupting the overall microbial population.

SUMMARY OF THE INVENTION

This invention is a method of reducing foaming in wastewater treatment plant systems via application of an effective amount of phages virulent for foam-causing filamentous bacteria. Phage control of filamentous bacteria provides a safe, environmentally sound effective means of reducing offending filamentous bacteria. This invention sharply reduces the use of toxic and environmentally unsound biocides.

The invention includes provisions for the identification, proliferation, and application of phages active against target filamentous bacteria in a wastewater treatment facility. Other advantages of and details of the invention are more fully described in the Detailed Description and claims.

DETAILED DESCRIPTION

The present invention relates to controlling the filamentous bacterial populations associated with bulking and foaming during the treatment of wastewaters from residential, municipal, industrial (including, but not limited to, the manufacturing, mining, energy, heavy, food, and medical industries), and agricultural and defense related activities. Filamentous bacteria are normal components of the complex microbial consortia at wastewater treatment facilities. These microbial consortia are integral to the remediation of wastewater as they are responsible for the conversion of undesirable components of influent liquids into forms acceptable for disposal. Filamentous bacteria, however, may periodically or chronically proliferate in such a way as to impede normal wastewater treatment plant (WWTP) operations through their contributions to bulking and foaming. Filamentous bacteria may contribute to bulking or the poor settling of solids through the formation of interfloc connections and/or the formation of gas-trapping voids in the floc or by as yet un-described mechanisms. Filamentous bacteria also contribute to foaming when hydrophobic filaments and surfactants entrap and stabilize bubbles. Foaming and bulking can result in failures to meet effluent standards as well as reducing the overall WWTP operation efficiencies.

The methods described herein utilize bacteriophages, or phages, to control filamentous bacteria associated with bulking and foaming during wastewater treatment. Phages are the viral predators of bacteria. In a typical lytic infection, phage proteins recognize and interact with targets on the host cell. Phage nucleic acids enter the host cell and phage replication and assembly of new phage virion particles occurs. Phage-encoded proteins or compounds interact with host cell envelope components, resulting in host cell death and lysis (bursting of the cell). Lysis disperses progeny virions into the environment, which may then repeat the infection cycle as long as sensitive host cells are available. Phages that always carry out a lytic infection with their host have historically been referred to as virulent phage. In contrast to virulent phage, some phages are temperate and capable of forming a meta-stable relationship with their host termed a lysogen. There are additional outcomes of the phage-host interaction events that are not covered by strict definitions of temperate or virulent, including pseudolysogeny and lysis inhibition. Instead of always entering a lytic infection cycle, some phage host interactions result in an arrested infection process sometimes termed a pseudolysogen. Another permutation of the phage/host interaction is the process known as "lysis inhibition" in which phage-mediated lysis of an infected cell is delayed, possibly due to environmental triggers, quorum sensing, the presence of high levels of free phages relative to host cells in the environment or do to undefined mechanisms. Some host/phage interactions lead to the death of the host cell even though no progeny virions are produced. One such event is known as an "abortive infection" in which the host cell recognizes that it is infected by a phage and kills itself. Another such situation is referred to as "lysis from without", which may happen when phage infection occurs at a very high ratio of phage particles to host cells, resulting in multiple phages simultaneously penetrating a single host cell which can result in host cell lysis and death. While the exact outcome of the phage/host interaction may not always be predictable, combinations including phages capable of any of these are candidates for use in phage preparations.

One of the most significant characteristics of most phages, in terms of use in controlling bacterial populations, is their tendency to be highly host specific. Phages typically exhibit a very narrow host range and most are able to form a productive infection on only a limited number of bacterial targets. Specificity may range from infecting only a few, typically closely related, bacterial genera, to infecting only single isolates or strains of a given bacteria species. There are literature reports of phages able to infect across multiple bacterial classes (such as gamma-proteobacteria and beta-proteobacteria) however few of these claims have withstood rigorous analysis.

There are two particularly relevant consequences of extreme host specificity. On the one hand, extreme host specificity is an advantage as phages are benign to non-target organisms, obviously including eukaryotes such as fungi, plants, and animals including humans. Less obvious, but of particular benefit for their use in wastewater treatment, is that phage are also benign towards non-target bacteria. As the wastewater treatment process is microbiological in nature, this presents a significant advantage to other methods that may inadvertently disrupt the normal microbiological activities required for wastewater processing.

The negative consequence of extreme host specificity and narrow host range is that phage preparations must be custom-tailored towards each targeted host. Generic preparations are problematic because the component phages will simply not be active against the target bacteria. Therefore, any program designed to use phage must include steps to identify (or locate) the target bacteria and match phage to that target bacteria.

It is imperative to understand the bacteria being targeted for phage-based control regime. The bacterial targets of this invention are the filamentous bacteria responsible for bulking and foaming during the wastewater treatment process. Those most commonly associated with bulk foaming are frequently referred to in the industry as "nocardioforms" because of the initial classification of one of the most prevalent members as *Nocardia amarae*. More recently, it has become recognized that many different members of the bacterial phyla of high GC content Gram-positive organisms, the Actinobacteria, which are also referred to as the Actinomycetes, may be present during a bulking or foaming incidence. Actinomycete genera frequently implicated in bulking and foaming include *Nocardia, Gordonia, Tsukamurella, Dietzia*, and *Microthrix*, however this list is not exhaustive. Members of the Actinomycetes containing mycolic acids in their cell envelop may also be referred to collectively as the mycolata. Mycolic acids are thought to specifically contribute to the propensity of these organisms to cause foaming and bulking. Additionally, non-actinomycete filamentous bacteria have also been associated with bulking and foaming, including but not limited to *Sphaerotilus, Leptothrix, Thiothrix, Haliscomenobacter*, and *Beggiatoa*. This list is not exhaustive and there are many types of filamentous bacteria identified visually at wastewater treatment plants that have not been classified to the Genus level. This application encompasses all foaming- and bulking-promoting bacteria, regardless of taxonomic classification.

It needs to be clarified that the nomenclature of filamentous bacteria implicated in bulking and foaming is not standardized, which may be confusing. For example, foaming is frequently referred to as "*Nocardia* foaming" or nocardial foaming. Many industrial and older scientific publications and reports suggest that *Nocardia amarae* is one of the major causal microorganisms in foaming and bulking in wastewater.

Because of this, the term "*Nocardia*" and derivatives such as nocardioform have become general terms in wastewater industry. However, *Nocardia amarae* was re-classified to *Gordona amarae* in 1994 (Klatte, Rainey and Kroppenstedt (1994) International Journal of Systematic Bacteriology, 44(4): 769-773). *Nocardia* is still the most commonly seen taxonomic reference within the industry, however these bacteria are more accurately referred to as "*Gordona*" or "*Gordonia*". In terms of utilization of phage to control bacterial populations, this point is more than a semantic issue as the extremely restricted host range of most phages means that they are usually only able to infect closely related hosts. The bacteria commonly referred to as nocardioform, or any derivative of *Nocardia*, in the wastewater treatment industry are one of the significant targets for phage treatment, regardless of actual taxonomic classification.

The number of effective phages in a preparation needs to be described. As used herein the following definitions apply: A phage cocktail includes multiple, independent, phages for each bacterial target. This is different from a phage panel, which is a collection of phages chosen to cover multiple bacterial targets. For the purposes of this invention the phage treatment will generally consist of a "panel of phage cocktails", that is, there will generally be at least two virulent phages for each target bacterial strain and each preparation will be made to target several bacterial strains. This "panel of cocktails" described above is designated herein as a "phage multi-panel". Because some phages are polyvalent—that is able to infect more than one strain of bacteria—it is possible that some phages in the preparation are there to target more than one host strain. For example, if each phage is able to control at least two different bacterial targets, a multi-panel could in one iteration be comprised of three types of phage chosen to counter five types of problem bacteria.

Process

In essence, the utilization of phages to control bacterial populations involves treating the system by the addition of sufficient numbers of phages active against the problem bacteria. This process can be broken down into four steps:

1. Diagnosing the system: i.e. target bacteria identification.
2. Identifying phages active against the target bacteria,
3. Phage Production: preparing phage in sufficient levels to be used for treatment, and
4. Phage Application: treating the system with the phage.

Several permutations will be described on how to execute steps 1 through 3. Phage application (step 4) will then be described.

The three most general embodiments of the execution of the invention are:

Embodiment 1. Traditional phage methodology approach,
Embodiment 2. Phage Library Rapid Screen approach, and
Embodiment 3. Phage proliferator approach.

These three approaches may be used entirely independently, or in varying combinations with each of the other approaches.

Traditional Phage Methodology Approach

The "traditional" phage methodology approach relies on the utilization of standard phage and bacteriological practices to first isolate and identify the host in the system and then to isolate and propagate phages active against the problem host. The first step in this approach is to obtain a sample of foaming or bulking material from the wastewater treatment facility. Filamentous bacteria in the sample can be cultured using a variation of classical microbiological techniques, including serial dilutions and plating on to semi-selective or indicator media that allows for colony growth with characteristic filamentous morphology. The identity of the cultured bacteria may be determined using molecular approach. Once target host bacteria are cultured to homogeneity, phage can be isolated using the enrichment method. For enrichment, extracts or extract concentrates of water, soil, foam, wastewater treatment plant samples, or any other sample considered to be a likely source of phages are prepared by combinations of filtration, centrifugation, or concentration by such methods as ion-exchange chromatography for example using DEAE cellulose. The prepared extract and host bacterial cells are mixed, usually along with fresh culture media (the composition of which is dependent on the exact host bacteria). The bacteria/extract mixture is then incubated for a period of time dependent on the growth characteristics of the host. This allows for even a single phage particle in the sample to infect and amplify on the target host. The presence of phage in this "enrichment" sample is assayed, typically by the spot titer method. In the spot titer method, a dilute agar solution is mixed with host bacterial cells and poured over a bottom agar prepared in nutrient broth appropriate for the host bacteria. Small volumes or serial dilutions of the enrichment are spotted onto this overlay or mixed into the overlay along with the host. Clearing in the turbid host lawn indicates phage activity. Phages in positive enrichments must then be amplified sequentially, typically using liquid lysate or plate lysate preparation methods, in order to prepare large volumes of high titer phage stock.

While straightforward, this "traditional phage methodology" approach is time consuming. Two additional embodiments are described that, individually or in combination, allow for more timely and reasonable execution of the steps needed for treating filamentous bacteria in wastewater treatment plants. These two approaches are termed the "Phage Library Rapid Screen" approach and the "Phage Proliferator" approach.

Phage Library Approach

In the "Phage Library Rapid Screen" embodiment, problem bacteria are rapidly matched with phages available in a pre-existing collection of different phages known as a phage library. The "Phage Library Rapid Screen" embodiment requires 1. that pre-assembled libraries of phages are available for each potential target bacteria, and 2. that a method for rapid identification of effective phages in the library for a particular foaming incidence. For example, the library may contain hundreds of phages active against the numerous *Gordonia* strains present in a geographical area. The majority of each individual phage types present in the "filamentous bacteria phage library" will have been isolated primarily using the enrichment method described previously or acquired from other sources, such as commercial sources. This process must be repeated many hundreds of times to assemble large libraries of diverse phage.

A significant technical challenge of the Phage Library Rapid Screen Approach is rapid matching of the filamentous bacteria from a foaming or bulking incidence to phage entries in the phage library Target bacteria are identified from samples of foam or bulking solids in the wastewater system. Bacterial identification must be performed to a level sufficient to narrow down which group of phages in the phage library should be screened for activity. This can be any combination of visual/morphological inspection or by the use of molecular techniques such as qPCR. The traditional way to match phage to a specific bacterial host is by the spot titer assay, as described in the section on performing enrichments. This requires purification of the host. However, the filamentous bacteria being targeted by this process are frequently slow-growing, and often difficult to culture.

To fill the need for rapid matching of problem bacteria to killer phage, novel and rapid approaches to enrich target bacteria from the sample and match to phage in the phage library have been devised. The first step of the rapid host/phage matching scheme involves concentrating the target bacteria from the starting sample. This may be done by taking advantage of immunogenic cell surface features (antigens) unique to each target bacteria and coupling antibodies raised against these antigens to an immuno-capture assay. An assay such as immuno-magnetic separation (IMS) technology can be used to selectively pull target bacteria out of the sample. For example, for *Gordonia amarae* (formally *Nocardia amarae*) the most obvious unique cell-surface features are the exposed mycolic acids in their cell wall. Mycolic acids are long chain alpha-alkyl-beta-hydroxy fatty acids whose exact structure differs greatly among different genera of mycolata. However, as more information on *Gordonia* becomes available, for example genomic analysis, the antigen used could switch, for example, to cell-surface exposed proteins. A variety of immuno-capture assays are available and any of these could be modified for this purpose.

In the simplest permutation, a sample of the foam or subsurface liquor would be incubated with, for example, paramagnetic beads coated with anti-*Gordonia* antibodies. In some cases, pre-treatment in order to loosen filaments from flocs, for example, by disruption of the sample using sonication or a weak detergent, might be required. Following incubation, the anti-*Gordonia*-antibody-bead complexes are recovered by applying a strong magnetic field and washed to remove unbound cells and contaminants. The resulting *Gordonia* bead-bound concentrate could be used to test for sensitivity against members of the phage library or used as bait for new phage hunts to augment the phage library.

The second key component of the rapid host/phage matching scheme is a rapid, high throughput phage sensitivity assay. This, in one embodiment, is based on having the phage libraries arrayed into 96-well format (or other appropriate high-throughput format) plates. The filamentous bacterial concentrate is then aliquoted into each of the wells of the plate and incubated to allow for phage infection of input bacteria. Phage replication in each well can be monitored by several methods. One method to monitor phage replication would be to use an ATP bioluminescence reagent kit and a luminometer. As phage cause host cell lysis, free ATP in each well increases upon host cell lysis, resulting in an increase in luminescence. Another approach would be to monitor for an increase in phage DNA copy number in each sample. If the genomic sequences of the phages are known (which would be used for qPCR primer design), this may be done by qPCR. If not, phages could be titered on indicator host lawns using an already characterized host strain.

The Phage Library Rapid Screen method of this invention results in saving of days, weeks, or even months in the amount of time it takes to match target bacteria in a foam or bulking solid sample to killer phage by more traditional methods.

In addition to library and natural or "wild" phages, as isolated from the environment, phages can be optimized for effectiveness by selection for naturally occurring variants, by mutagenesis and selection for desired traits, or by genetic engineering. Traits that might be optimized or altered include, but not limited to, traits involved in host range determination, growth characteristics, improving phage production, or improving traits important for the phage delivery processes. Thus, in another aspect, the step of producing the infective phage panel includes creating engineered phages against the selected bacterial population. These could include phages created for having a broad host range. These may be the product of directed genetic engineering or obtained by selection for naturally occurring variants, for example.

The Phage Proliferator

The Phage Proliferator method, which is the third general embodiment of this invention is a significant departure from the deterministic approach described in the Traditional and Phage Library Rapid Screen embodiments. Instead, the phage proliferator utilizes a so-called "shotgun approach" for on-site phage concentration, amplification, and application. The theoretical basis for the phage proliferator is a combination of the general knowledge that phage are found where their target bacteria are located, but that phage concentration levels lag behind the level or their target bacteria. Thus, most systems will have phages present that are capable of controlling the endogenous bacterial population, however the phage levels typically lag behind the level of target bacteria. However, as bacterial populations increase, their levels may be controlled by phage predation, a situation sometimes termed the "kill the winner". The goal of the phage proliferator is to recapitulate an environment that promotes a "kill the winner" outcome between target bacteria and phage. The most important considerations to achieve this are attaining high concentrations of target host cells and phage while maintaining physiologically conditions conducive to phage infection and proliferation.

Concentration of both phage and bacteria are critical to achieve meaningful replication rates as the initial contact between phage and bacteria is governed largely by the concentrations of phage and the bacteria in the system, simply due to collision dynamics. However, efficient phage adsorption and establishing a productive infection are controlled largely by the physiological state of the host cell and the condition of the infecting phage. To achieve maximum phage yields or to achieve maximum bacterial reductions, each of these factors must be taken into account.

Mathematical models allow us to theoretically calculate the dynamics of the host and phage population change in a given system. Based on theoretical calculations, for effective and timely phage infection and lyse of target bacteria, it is necessary to have some idea about the amount of bacteria that need to be replicated. To kill as many target bacteria as possible, target cell concentration is less relevant as long as enough phage can be introduced into the system to adsorb greater than 90% the cells in a timely manner. On the other hand, in a situation where high phage yield or a net gain of progeny phage after lysis is desired, relative high concentrations of bacteria (greater than $10^5$-$10^7$ CFU/ml) are required. Thus, for practical application virulent phage and target bacteria concentrations will need generally to be above $10^5$ particles/ml to achieve meaningful replication of phage and destruction of bacteria.

The bacteriophage that may be concentrated and/or produced by this invention span the range of virulent bacteriophage, but the invention is thought to be most useful where large amounts of phage are required. In these applications, it will often be requires to prepare multiple bacteriophage, as for phage panels, phage cocktails and phage multi-panels.

In one embodiment an aliquot of water from a wastewater vessel is removed, target bacteria and phages concentrated in separate solutions, the phage solution mixed with the target bacteria solution to effect replication of virulent phages to produce a greater concentration of phages and returning the more concentrated to the wastewater water system.

One way to achieve concentration and replication of target bacteria and phage would be to equip the phage proliferator with separate series of filtration and centrifugation systems, designed to separate and concentrate phage and target bacteria. Once separation from the bulk of the bacteria and phage is achieved, then the phage and target bacteria are mixed and incubated under conditions designed to promote phage replication. Separation and concentration systems include low speed and high-speed centrifugation steps, impact filtration, and tangential flow filtration. These systems are daisy chained in easily re-configurable format. Re-configuration is a required feature of the system as site-to-site or even day-to-day differences in liquor and foam characteristics will affect what degree of filtration or centrifugation is needed.

Essentially, in one embodiment, liquor from a foaming basin will be withdrawn just below the foam line. If needed, filamentous bacteria can be dissociated from floc bacteria with a sonicator or with mild detergents. Then, a very course filter (greater then 50 micron) will be used to remove large debri, non-dissociated flocs, animals, and protazoans. Then, the sample will be passed through a medium (10 to 20 micron) tangential flow filter, which will exclude filaments but allow phage, cell debris, chemicals, and small bacteria through. Phage will then be sequentially purified from cells, ultimately by passage through a 0.45 or 0.2 micron filter. If required, phage could then be concentrated using a small cutoff filter (around 100 kDa) to allow chemicals and water to pass but retain phage and viruses. The filamentous bacterial concentrate and the phage concentrate would then be mixed in production tanks on-site or at an off-site central location. This bioreactor loop is the heart of the "phage proliferator".

This proliferator method of producing specific phages comprises separating the target bacteria from other bacteria in the system and mixing the specific bacteria with a mixed phage/virus concentrate from the same system. For example, *Gordonia* are concentrated and mixed with the phage fraction, only *Gordonia*-specific phage will be amplified. The phage virulent for the predominant bacteria will, therefore, be concentrated and the stream exiting the proliferator will contain predominately phage virulent for the target bacteria. If, then, in the larger water body the target virulent phage will be further replicated and the target bacteria killed. Other bacteria will be unaffected.

One of the advantages of the proliferator method is that taxonomic identification of the filamentous bacteria is not strictly required, as long as it can be determined by visual inspection under a microscope to be enriched. However, if taxonomic identification is achieved, then the proliferator could be seeded not just with the phage fraction on site, but also with phage from the phage library.

This proliferator method, in one embodiment, may be an on-site bioreactor comprising a vessel into which is injected a solution of at least one target bacteria and a solution of at least one virulent for the target bacteria each solution have a concentration of bacteria or phage of at least $1 \times 10^5$ particles/ml and allowing the solutions to remain in contact in the vessel for sufficient time for at least a measurable reduction of at least one strain of target bacteria are infected with phage and injecting the resulting solution into the waste water system. At least a 25% reduction is desirable but not essential to the practice of the invention.

This type of proliferator method, for another bacterial application, is more fully described in patent application Ser. No. 12/983,136, US Publication No. 2001/0171719, published Jul. 14, 2011, filed Dec. 31, 2010, the relevant parts of which are incorporated herein by reference.

The bioreactor may be mobile, for example mounted on a truck, trailer or skids. Alternatively, on-site or stationary bioreactors could be constructed at larger facilities requiring constant mitigation of filamentous bacteria.

Large Scale Phage Production

Phages are produced, in one embodiment, using a standard liquid lysate method. It should be noted that industrial scale phage production has been achieved inadvertently by the dairy industry and historically by the acetone/butanol fermentation industry which demonstrates the feasibility of aerobic and anaerobic phage production on this scale.

1. Prepare an exponentially (=OD600~0.3) growing stock of the target host in the volume of liquid corresponding to the desired final lysate volume. This is done by inoculating the media from a stationary stage liquid culture to a very low (OD600~0.01) and monitoring growth specrophotometrically until the desired OD is reached.
2. Inoculate this culture with phage to a moi (multiplicity of infection=ratio of phage particles to individual host cells) of 0.1 to 0.001.
3. The culture is then incubated until lysis is observed; typically over night but can take several days depending on the host growth rate. At this point the lysate is ready for purification of the phage particles away from both bacterial cell debris and the components of the culture media. This is accomplished first by vacuum filtration through a filter series with the final pore size being 0.2 μm. Finally, tangential flow filtration will be used to replace components of the media with 10 mM phosphate buffer and, if necessary, to concentrate the phage.

Crude phage lysates contain not just phage particles but also residual host cells and cell debris and require filtration prior to storage and application. For large volume phage lysate filtration, tangential flow filtration (TFF) will be used. TFF is a commonly used bio-processing method in pharmaceutical companies for purifying biological particles, including viruses. This allows phage multi panels (panel of cocktails) to be shipped to remote locations for use. It allows the manufacture to be made at optimized central locations. While it may be desirable that steps 1-6 be made "on location" it is generally preferred that the manufacture of the large scale phage cocktail be centralized in locations where the necessary equipment and resources are readily available.

Treating Wastewater System with Phage

Regardless of what method is used to assemble the effective phage multi-panel, the final stage in the treatment process is phage application to the wastewater system. The infective phage panel is delivered by mixing an effective amount of phage multi-panel into the target wastewater system. An effective amount of phage is the volume and concentration that will effect measurable destruction of target bacteria. In one embodiment in foaming wastewater system, an effective amount of phage multi panel in aqueous solution is applied to the surface of the aeration basin after physical removal of the foam layer. In another embodiment, the phage multi-panel is sprayed onto the foam using a pressurized spray bottle or other suitable spray means. In another embodiment the treatment involves the use of a small mobile concentrator unit (bioreactor) that is placed on the edge of the tank with a drip line (or drip "net") that runs across the top of the foam (or becomes slightly depressed into the foam). A controlled amount of phage panel, cocktail or multi-panel solution is pumped from the unit into the drip line, where it drops into the water system at different points across the tank, giving the phage in the surrounding area time to exponentially grow. After a set amount of time, the line can be moved around the tank to reach other foaming areas.

In another embodiment, phage preparations may be formulated into granules. These phage granules could then be spread over the aeration basin. By varying the granule density, the propensity of the phage granule to sink or float may be modified, allowing for targeted delivery to the portion of the water column were bulking is occurring. By varying the composition of the granule matrix, the dissolution time can be tailored to allow for control of phage leaching into the aqueous solution.

In another embodiment, the phage preparations are formulated and packaged in such a manner as to retard removal from the system. Aeration basins experience high volume turnover on a daily basis. High turnover rates have enormous consequences in terms of how much phage must be used to treat a system. Phage could be applied in the form of larger, slower dissolving applicators that are fixed within the aeration basin. In another permutation, phage could be fixed, for example into a surface coating such as with phage containing paint.

EXAMPLE 1

An aeration basin foaming outbreak was identified at a small municipal wastewater treatment facility. Samples, approximately 500 ml, were collected of the foam and liquor (the aeration basin liquids). The sample was allowed to settle until three layers separated (foam layer on top, relatively clear liquor layer in the middle, activated sludge at the bottom). Microscopic inspection revealed the presence of nocardioform filaments in the foam. 1 ml of the sample from the foam layer (closer to the water layer) was added to into 4 ml of 0.1% peptone water (PBS, saline or sterile media may also be used) contained in a sterile culture tube and mixed thoroughly. Using 0.1% peptone water (or PBS or Saline), serial 10 fold dilutions were performed to $10^{-7}$ and 100 µl of each dilution was plated in duplicate onto Minimal Salt Agar culture plates. Plates were incubated inverted at 26-30° C. Each plate was examined daily for the presence of filamentous colonies at 10× magnification (phase contrast mode). Filamentous colonies were identified and monitored until they developed into visible colonies. The next step involved isolating the filamentous colonies were isolated (as e.g. picking them using inoculation loops), and purified by streaking onto fresh plates. The purification was enhanced by repeated passage. BHI (Brain Heart Infusion) agar can be used for the purification steps to support faster growth. The identity of the purified filamentous bacterial culture is characterized based on its 16s ribosomal DNA (rDNA) analysis. This information is correlated to 16s rDNA analysis of the original sample to determine the relative abundance of the cultured isolate in the starting sample.

EXAMPLE 2

Phages active against the isolated and purified filamentous bacteria were isolated from various sources (such as influent water, effluent water, and aeration basin liquor from wastewater treatment plants, and soil samples, etc.). An enrichment approach was used to amplify phages in the raw samples using the isolated filamentous bacteria hosts as bait. Phages capable of forming plaques on overlays of one or more hosts were isolated and purified. Isolated phages were characterized based on their plaque morphology, host ranges, microscopic images, genomic DNA characteristics, etc. The host ranges of these phages were assessed by spotting the individual phage onto lawns of a comprehensive collection of the hosts. Any clearing spot generated on a host lawn was interpreted as a positive result. Transmission electron microscopy was used to image the phages. Most the phage isolated against filamentous mycolata hosts exhibited icosohedral heads (diameter ranging from approximate 60 to 80 nm) and long flexible tails (length ranging from approximate 200 to 550 nm), indicating that they belong to phage morphotype Siphoviridae. Genomic DNA analysis was carried out via standard molecular characterization technique known as restriction fragment length polymorphism (RFLP) mapping. RFLP mapping is accomplished by isolating the phage genomic DNA and subjecting it to DNA restriction enzyme digestion. The digested DNA fragments were subjected to DNA agarose gel electrophoresis and the DNA segments of different sizes were therefore illustrated. Further detailed sequence analysis was carried out for phages of interest, by obtaining the complete genome sequences via pyrosequencing.

EXAMPLE 3

Phage efficacy experiments were designed in order to determine if the isolated phage can be used to control populations of the isolated filamentous, foam generating bacteria. The phage killing efficacy tests were first performed in batch cultures of the filamentous bacterial host. In details, 10 mL bacterial host was grown to late log growth phase in side arm flask, and single phage, or a phage cocktail consisting of multiple characterized phages was added to the culture. The estimated "multiplicity of infection" (MOI) for each phage was approximately 5-10. MOI is the ratio of phage plaque forming units to bacterial cells. A control culture, containing an identical host culture grown without phage treatment, was incubated in parallel. The growth of the host cultures was monitored over time by taking periodic light absorption readings via the side arms of the flasks (recorded via a spectrophotometer as absorption values or via a Klett meter as Klett meter units). Phage efficacy experiments conducted on two different filamentous bacterial hosts showed that there was significant decrease in the host levels of the phage treated cultures throughout the experiments, in comparison to the control cultures grown without phage addition. The growth inhibition of the host bacteria due to phage treatment was evident throughout the experiment. Although all phage treatments were effective, the treatment using the phage cocktail appeared to be the most effective compared to single phage treatments. Host cell quantification by plate counting indicated the final level of the live cells in the phage treated cultures were between $10^4$ to $10^6$ colony forming units/ml. This value is approximately 1,000 to 10,000 times lower than that of the control culture without phage treatment, which were found to contain $10^9$ colony forming units/ml. The phage treated filamentous bacterial cultures appeared noticeably clearer than the control cultures, and exhibited significantly less foaming capability upon agitation (less foams accumulated at the air-liquid interface). These independent phage lysis experiments conducted in batch cultures confirm the potential of phage to diminish filamentous bacterial host concentrations.

EXAMPLE 4

Phage efficacy experiments were also conducted in continuous culture of filamentous bacterial host, which duplicates "real world" wastewater treatment plant conditions, wherein multiple species of filamentous bacteria grow in activated sludge continually replenished with a fresh influx of more filamentous bacteria. Growth parameters for large-volume filamentous bacterial host culture were determined. Using bioreactors of large volumes, the studied hosts were grown routinely in BHI at room temperature with headspace aeration. This culturing mode is suitable for high volume, high density cultures, for both phage efficacy tests and for phage production. The filamentous bacterial host was inoculated into 2 L of BHI broth contained in a 4 L bioreactor. Under headspace aeration, the culture was mixed by magnetically driven paddle at approximately 120 rpm. When the culture reached mid-log growth phase (OD600 nm=0.8), phage was added to the culture at a final titer of approximate $2\times10^8$ pfu/ml. A control culture was maintained in parallel, without phage inoculation (replacing phage suspension with BHI). Fresh BHI broth was fed manually in batches (100 ml per batch) every 12 hours to both cultures, and the cultures were also subject to batched withdrawal (100 ml per batch), via the side arm fittings. The cell density of both control and phage treated cultures were monitored over time. Compared to the control culture, a significant growth inhibition effect was observed in the phage treated culture. The phage titer at the end of the experiment (192 h) was determined to be $8\times10^7$ pfu/ml.

EXAMPLE 5

Laboratory scale aeration basin systems were set up to test phage efficacy in mixed populations of bacteria derived from real activated sludge. Plastic basins were used to contain activated sludge freshly collected from the local wastewater treatment plant. Continuous aeration was provided from the basin bottom via aeration stones and air pumps. The effect of phage on *Gordonia* species was tested. The total volume of the activated sludge in the aeration basins was 10 liters. The activated sludge was inoculated with *G. sputi* at a final level of approximate $3\times10^7$ cfu/ml. Phage cocktails, which contained 4 high titer phages, was also inoculated into the aeration basin at a final level of approximate $2\times10^8$ pfu/ml for each phage. A control aeration basin was set up in parallel.

The experiment started at time 0 hour (h), and at time 40 h, 67 h, 90 h, 96 h, and 114 h, activated sludge was sampled from both the control and phage treated systems. The cells were pelleted for DNA isolation, and the supernatants were filter sterilized for phage titering. To monitor the level of *G. sputi* in both the control and phage treated systems via PCR, *G. sputi* specific primers (Forward primer: SEQ ID No: 1 5'-CATTTTTCCTCGCATGGGGATTTG-3', Reverse primer: SEQ ID No: 2 5'-CACTTGCGCTTCGTCGGAGC-3') were designed based on the 16s rRNA sequence specific to *G. sputi*. The total bacterial level of the activated sludge systems was also monitored using the primers (Forward: SEQ ID No: 3 5'-CCTACGGGAGGCAGCAG-3', Reverse: SEQ ID No: 4 5'-CCCCGTCAATTCCTTTGAGTTT-3') targeting the universally conserved regions of bacterial 16s rRNA sequences. With the amounts of template DNA standardized, the amounts of PCR products amplified (25 PCR cycles) from the phage treated systems were compared to that of the control systems at each sampling point. At each starting amount of total template DNA (65 ng, 6.5 ng, 650 pg, 65 pg, 6.5 pg, 0.65 pg per PCR reaction), the amount of PCR products amplified using the universal 16s rRNA primers were similar in the control and in the phage treated systems, evaluated at all time points (bands with similar intensity at approximate 600 bp). This indicates the similar levels of total bacteria in both systems throughout the experiment. Compared to the control system, a reduced *G. sputi* level was observed in phage treated system at 40 h after phage addition, indicated by the reduced amount of PCR products amplified using *G. sputi* specific primers (weaker bands at approximately 300 bp) at each template levels. This phage effect on *G. sputi* was pronounced at 90 h, where the amount of PCR products from 65 ng template DNA in the phage treated system was comparable to that from 6.5 ng template DNA in the control system. This suggests phage treatment for 90 h resulted in an approximate 10-fold reduction of *G. sputi* in the phage treated system compared to the control. The calculated starting level of *G. sputi* in the aeration basin systems was approximate $3\times10^7$ cfu/ml, the *G. sputi* level in phage treated system is thus estimated to be at $10^6$ cfu/ml. This phage treated *G. sputi* level is still higher than the indigenous *G. sputi* level in the activated sludge. The phage cocktail was added at approximate $2\times10^8$ pfu/ml, and the indigenous phage that showed lysis against *G. sputi* strain 11 was undetectable in the activated sludge at the starting point of the experiment. The MOI of phage treatment in this experiment was thus determined to be approximate 7. Given the similar amplification efficiency between using *G. sputi* specific primers and universal 16s primers at the same levels of input *G. sputi* template DNA, the comparison between *G. sputi* specific PCR and total bacteria PCR suggest that the total bacteria flora level in both control and phage treated systems is $10^3$-$10^4$ higher than that of *G. sputi* throughout the experiment. The fact that phage applied at a MOI of 7 reduced the level of *Gordonia* in the matrix where the background microorganisms are at overwhelming levels, highlights the success of this phage efficacy study. Continuing monitoring of the phage levels in the treated, system indicated that the applied phage was maintained at a stable level for 96 hours during the experiments. These phage efficacy test in the lab-scale aeration basin system thus demonstrated the potential of using phage in reducing *Gordonia* levels in nocardioform foaming in real world.

EXAMPLE 6

Using *Gordonia* phages as model systems, conditions for high titer phage ($10^9$-$10^{10}$ pfu/ml) production in liquid cultures of scaled-up volumes (up to 2 L) were optimized. The optimized control parameters include the host culturing conditions, phage inoculation time and dose, and phage lysate harvest time. The different configurations for routine phage production at flexible volumes are illustrated, and the optimized conditions are as follows. *Gordonia* was grown in BHI broth in bioreactors (spinner flasks) of appropriate volumes. The spinner flasks were placed on a magnetic stir plate, and while the magnetically driven paddle mixed the liquid culture, headspace aeration of the culture was provided by pumping air through a 0.2 um filter connected to the size arm fitting. Alternatively, to replace the air pumping apparatus, *Gordonia* host was grown in a smaller volume of BHI broth (up to 1 L) in a smaller spinner flask equipped with vented side arm closures (containing built-in 0.2 um sterile air filter). *Gordonia* host was grown to early log growth phase (OD600 nm being approximate 0.2). Phage was inoculated at a MOI of approximate 0.01. With the host cell density (via OD600 nm) monitored over time, the phage lysate was harvested usually after 48 h post phage inoculation, a time when the OD600 nm measurement of the host culture usually exhibited a slight drop and then reached a stable level.

To purify the harvest large volume phage lysate which contains phage particles, intact host cells and cell debris, tangential flow filtration (TFF) was evaluated as an improvement over impact filtration. Commercially available TFF hollow fiber modules with membrane pore size of 0.2 um were evaluated. The harvested phage lysates were passed through 0.2 um TFF filters, where phage particles were passed into the permeate while leaving the bacteria in the retentate. Optimal parameters, including the transmembrane pressure and liquid flow rate, were determined to achieve the total and efficient recovery of phage particles from the phage lysate liquid. Compared to impact filtration through which large volume of *Gordonia* phage lysates showed great difficulty in pass through 0.2 um filters, TFF showed significantly improved efficiency in purifying phage particles from scaled-up volume of phage lysate. Full recovery of phage particles from phage lysates was also achieved, as determined by comparing the phage titers before and after TFF. In fact, our current TFF practice can be easily scaled up for processing phage lysate at even larger volumes.

TFF was also tested for concentrating phage particles in liquid suspensions. Hollow fiber cartridges with membrane of various kDa Molecular Weight Cut-Off were evaluated. TFF purified phage lysate at different starting titers (lower than $10^8$ pfu/ml) was subject to phage particle concentration using TFF. The generated retentate was subject to continuous TFF through membrane of smaller pore size (such as 100 kDa membrane), so that the volume of the retentate was reduced to the minimal, therefore to achieve the greatest magnitude of concentration. Our results suggest that it is feasible to use TFF to concentrate phage particles in phage lysate of lower starting titers ($<10^9$ pfu/ml). Starting with large volume of phage lysate, it is possible to use TFF to generate final concentrated phage suspensions that have very high titers ($>10^{10}$ pfu/ml). Other than phage lysate purification and concentration, TFF is routinely used our laboratory for new phage hunting, which involves purifying and concentrating phage particles from large volumes of environmental samples. Our accumulated data suggests that replying on similar control parameters, TFF can be used for phage purification and concentration at a scale suitable for future commercial use.

In the foregoing specification, the invention has been described with reference to specific embodiments thereof. It will, however, be evident that various modifications and changes can be made thereto without departing from the broader spirit and scope of the invention as set forth in the appended claims. The specification is, accordingly, to be regarded in an illustrative rather than a restrictive sense. Therefore, the scope of the invention should be limited only by the appended claims.

The invention claimed is:

1. A method for reducing foaming in wastewater systems comprising contacting water in a wastewater system with an effective amount of phages virulent for foam causing filamentous bacteria.

2. The process of claim 1 which further comprises;
   identifying a target filamentous bacteria strain or strains in a wastewater water system;
   locating and enriching a phages virulent for said bacteria strains, and
   contacting water in the wastewater water system with an effective amount of phages so enriched to effect a reduction of the target filamentous bacteria.

3. The method of claim 2 wherein target filamentous bacteria are *Actinomycetes*.

4. The method of claim 3 wherein target filamentous bacteria are mycolata, containing mycolic acid in the cell envelop.

5. The method of claim 1 wherein the phage is a multi-panel of phage(s) virulent for target bacteria.

6. The method of claim 1 wherein the concentration of phage virulent for at least one target filamentous bacterial is at least, $10^5$ particles/ml.

7. The method of claim 6 wherein the MOI of virulent phages is at least 5.

8. The method of claim 1 wherein the phages are known virulent phages from a phage library.

9. The method of claim 1 wherein an aliquot of water from a wastewater vessel is removed, target bacteria and phages concentrated in separate solutions, the phage solution mixed with the target bacteria solution to effect replication of virulent phages to produce a greater concentration of phages and returning the more concentrated to the wastewater water system.

10. The method of claim 9 wherein the concentration of phages is conducted off-site.

11. The method of claim 1 wherein phage is provided from a bioreactor comprising a vessel into which is continuously injected a solution of at least one target filamentous bacteria withdrawn from below the foam line of a basin of the wastewater system to be treated and a solution of at least one phage virulent for the target bacteria, each solution having a concentration of target bacteria or phage of at least $1\times10^5$ particles/ml, and allowing the solutions to remain in contact as they pass through the vessel for sufficient time for at least one strain of target filamentous bacteria to be infected with phage and continuously injecting the resulting solution into the waste water system.

12. The method of claim 11 wherein the bioreactor is placed so that a drip line or drip net can be run from the bioreactor across the top of or slightly depressed into foam on a wastewater basin water.

13. The method of claim 11 wherein at least 25% of target bacteria are infected.

14. The method of claim 13 wherein target bacteria and virulent phages reside in the wastewater system and the withdrawn solutions are concentrated to concentrations of target bacteria and virulent phages respectively of, at least, $10^5$ particles/ml, and concentrated bacteria solution is contacted with the phages solution to effect replication of phages and the solution of replicated phages added back to the wastewater system.

15. The method of claim 14 wherein the phage solution is concentrated to a concentration of, at least, $10^6$ particles/ml.

16. The method of claim 14 wherein target bacteria are concentrated by filtration and phages are concentrated by filtration of the solution that passes through the filter for target bacteria.

17. The method of claim 16 wherein the filtration is effected in tangential flow filters.

* * * * *

SEQUENCE LISTING

```
<160> NUMBER OF SEQ ID NOS: 4

<210> SEQ ID NO 1
<211> LENGTH: 24
<212> TYPE: DNA
<213> ORGANISM: Gordonia sputi
<220> FEATURE:
<221> NAME/KEY: misc_feature
<222> LOCATION: (1)..(24)
<223> OTHER INFORMATION: Forward primer specific to G. sputi, designed
      based on the 16s rRNA sequence specific to G. sputi.  Used to
      monitor the level of G. sputi in control and phage treated systems
      via PCR.
<300> PUBLICATION INFORMATION:
<301> AUTHORS: Arenskotter, Matthias
      Broker, Daniel
      Steinbuchel, Alexander
<302> TITLE: Biology of the Metabolically Diverse Genus Gordonia
<303> JOURNAL: Applied and Environmental Microbiology
<304> VOLUME: 70
<305> ISSUE: 6
<306> PAGES: 3195-3204
<307> DATE: 2004-06
<313> RELEVANT RESIDUES IN SEQ ID NO: (1)..(24)

<400> SEQUENCE: 1
catttttcct cgcatgggga tttg                                           24

<210> SEQ ID NO 2
<211> LENGTH: 20
<212> TYPE: DNA
<213> ORGANISM: Gordonia sputi
<220> FEATURE:
<221> NAME/KEY: misc_feature
<222> LOCATION: (1)..(20)
<223> OTHER INFORMATION: Forward primer specific to G. sputi, designed
      based on the 16s rRNA sequence specific to G. sputi.  Used to
      monitor the level of G. sputi in control and phage treated systems
      via PCR.
<300> PUBLICATION INFORMATION:
<301> AUTHORS: Arenskotter, Matthias
      Broker, Daniel
      Steinbuchel, Alexander
<302> TITLE: Biology of the Metabolically Diverse Genus Gordonia
<303> JOURNAL: Applied and Environmental Microbiology
<304> VOLUME: 70
<305> ISSUE: 6
<306> PAGES: 3195-3204
<307> DATE: 2004-06
<313> RELEVANT RESIDUES IN SEQ ID NO: (1)..(20)
```

-continued

```
<400> SEQUENCE: 2
cacttgcgct tcgtcggagc                                               20

<210> SEQ ID NO 3
<211> LENGTH: 17
<212> TYPE: DNA
<213> ORGANISM: Unknown
<220> FEATURE:
<223> OTHER INFORMATION: Forward primer targeting the universally
      conserved regions of bacterial 16s rRNA sequences. Used to
      monitor total bacterial level of activated sludge systems.
<300> PUBLICATION INFORMATION:
<301> AUTHORS: Teske, Andreas
      Wawer, Cathrin
      Muyzer, Gerard
      Ramsing, Niels B.
<302> TITLE: Distribution of Sulfate-Reducing Bacteria in a Stratified
      Fjord (Mariager Fjord, Denmark) as Evaluated by Most-Probable-
      Number Counts and Denaturing Gradient Gel Electrophoresis of
      PCR-Amplified Ribosomal DNA Fragments
<303> JOURNAL: Applied and Environmental Microbiology
<304> VOLUME: 62
<305> ISSUE: 4
<306> PAGES: 1405-1415
<307> DATE: 1996-04
<313> RELEVANT RESIDUES IN SEQ ID NO: (1)..(17)

<400> SEQUENCE: 3
cctacgggag gcagcag                                                  17

<210> SEQ ID NO 4
<211> LENGTH: 22
<212> TYPE: DNA
<213> ORGANISM: Unknown
<220> FEATURE:
<223> OTHER INFORMATION: Reverse primer targeting the universally
      conserved regions of bacterial 16s rRNA sequences. Used to
      monitor total bacterial level of activated sludge systems.
<300> PUBLICATION INFORMATION:
<301> AUTHORS: Teske, Andreas
      Wawer, Cathrin
      Muyzer, Gerard
      Ramsing, Niels B.
<302> TITLE: Distribution of Sulfate-Reducing Bacteria in a Stratified
      Fjord (Mariager Fjord, Denmark) as Evaluated by Most-Probable-
      Number Counts and Denaturing Gradient Gel Electrophoresis of
      PCR-Amplified Ribosomal DNA Fragments
<303> JOURNAL: Applied and Environmental Microbiology
<304> VOLUME: 62
<305> ISSUE: 4
<306> PAGES: 1405-1415
<307> DATE: 1996-04
<313> RELEVANT RESIDUES IN SEQ ID NO: (1)..(22)

<400> SEQUENCE: 4
ccccgtcaat tcctttgagt tt                                            22
```